(12) United States Patent
Pinto (10) Patent No.: US 8,149,422 B2
(45) Date of Patent: Apr. 3, 2012

(54) SYSTEM AND METHOD FOR DISPERSION-FORCE-BASED ACTUATION

(75) Inventor: Fabrizio Pinto, Monrovia, CA (US)

(73) Assignee: InterStellar Technologies Corporation, Monrovia, CA (US)

( * ) Notice: Subject to any disclaimer, the term of this patent is extended or adjusted under 35 U.S.C. 154(b) by 457 days.

(21) Appl. No.: 12/212,470

(22) Filed: Sep. 17, 2008

(65) Prior Publication Data

US 2009/0084934 A1    Apr. 2, 2009

Related U.S. Application Data

(60) Provisional application No. 60/973,170, filed on Sep. 17, 2007.

(51) Int. Cl.
*G01B 11/02* (2006.01)

(52) U.S. Cl. ............................................. 356/512

(58) Field of Classification Search .......... 356/512, 356/521; 250/201.9
See application file for complete search history.

(56) References Cited

U.S. PATENT DOCUMENTS

| | | | |
|---|---|---|---|
| 6,477,028 B1 | 11/2002 | Pinto | |
| 6,650,527 B1 | 11/2003 | Pinto | |
| 6,661,576 B2 | 12/2003 | Pinto | |
| 6,665,167 B2 | 12/2003 | Pinto | |
| 6,842,326 B2 | 1/2005 | Pinto | |
| 6,888,872 B2 * | 5/2005 | Vetrovec | ........................ 372/95 |
| 6,920,032 B2 | 7/2005 | Pinto | |

OTHER PUBLICATIONS

Chen, et al., "Demonstration of Optically Modulated Dispersion Forces," Apr. 16, 2007, Optics Express, vol. 15, No. 9, pp. 4823-4829.*

Pinto, "Adaptive optics actuation by means of van dre Walls forces: a novel nanotechnology strategy to steer light by light," 2008, Proc. of SPIE, vol. 7266, pp. 726616-1 through 16-9.*

* cited by examiner

*Primary Examiner* — Gregory J Toatley
*Assistant Examiner* — Scott M Richey
(74) *Attorney, Agent, or Firm* — DeMont & Breyer, LLC (57) ABSTRACT

A system and method for dispersion-force-based actuation are disclosed. In some embodiments, a light beam is used to change the dispersion force between two spaced apart surfaces. The change in the dispersion force causes a change in the gap between the surfaces. The actuation system can be used in conjunction with a deformable mirror to provide an improved adaptive optics system.

16 Claims, 9 Drawing Sheets

SYSTEM AND METHOD FOR DISPERSION-FORCE-BASED ACTUATION

STATEMENT OF RELATED CASES

This case claims priority of Ser. No. 60/973,170 filed on Sep. 17, 2007 and incorporated by reference herein.

FIELD OF THE INVENTION

The present invention relates to the actuation and control of deformable surfaces.

BACKGROUND OF THE INVENTION

Since its invention 400 years ago, the astronomical telescope has evolved from a small, manually-pointed device for visual observations to a large and sophisticated computer-controlled instrument with full digital output. Throughout this development, two parameters have been particularly important. One is the light-collecting power or diameter of the telescope, which relates to the ability of the telescope to detect fainter and more distant objects. The other parameter is the angular resolution of the telescope, which relates to the image sharpness. For a perfect telescope used in a vacuum, resolution is directly proportional to the inverse of the telescope diameter. In such a telescope, a plane wave front from a distant star (i.e., effectively at infinity) would be converted into a perfectly spherical wave front, forming the image, with an angular resolution limited only by light diffraction-aptly called the "diffraction limit."

In practice, both atmospheric errors and telescope errors distort the spherical wave front, creating phase errors in the image-forming ray paths. More particularly, turbulence in various layers of the atmosphere induces random spatial and temporal wave front perturbations. As a consequence, ground-based telescopes sited at even the best locations and observing at visible wavelengths cannot achieve an angular resolution better than telescopes of 10-centimeter (cm) to 20-cm diameter. For a 4-meter (m) telescope, atmospheric distortion degrades the spatial resolution by more than one order of magnitude compared with the diffraction limit. And the intensity at the center of the star image is lowered by a factor of 100 or more. In fact, one of the principal reasons for flying the Hubble Space Telescope was to avoid this image "smearing." In addition, image quality is affected by permanent manufacturing errors and by long time scale wavefront aberrations introduced by mechanical, thermal, and optical effects in the telescope, such as defocusing, de-centering, or mirror deformations generated by their supporting devices.

Because it was thought that atmospheric distortions could not be avoided, development efforts were directed toward implementing mechanical improvements to minimize telescope errors. For example, mirror figuring and polishing techniques have been improved and stiffer structures and mirrors are now used to minimize gravitationally-induced deformations. Low-expansion glass was introduced to avoid mirror distortions with temperature variations. Additionally, heat dissipation from motors and electronic equipment was minimized during the night. In a properly designed and well-manufactured medium-size telescope, image quality is now limited mainly by atmospheric distortions.

By the mid 1980s, it became clear that conventional methods of maintaining image quality for telescopes with very large mirrors were not feasible due to cost and weight limitations. As a result, the technique of "adaptive optics" was developed for medium or large telescopes.

Figures 1, 2:
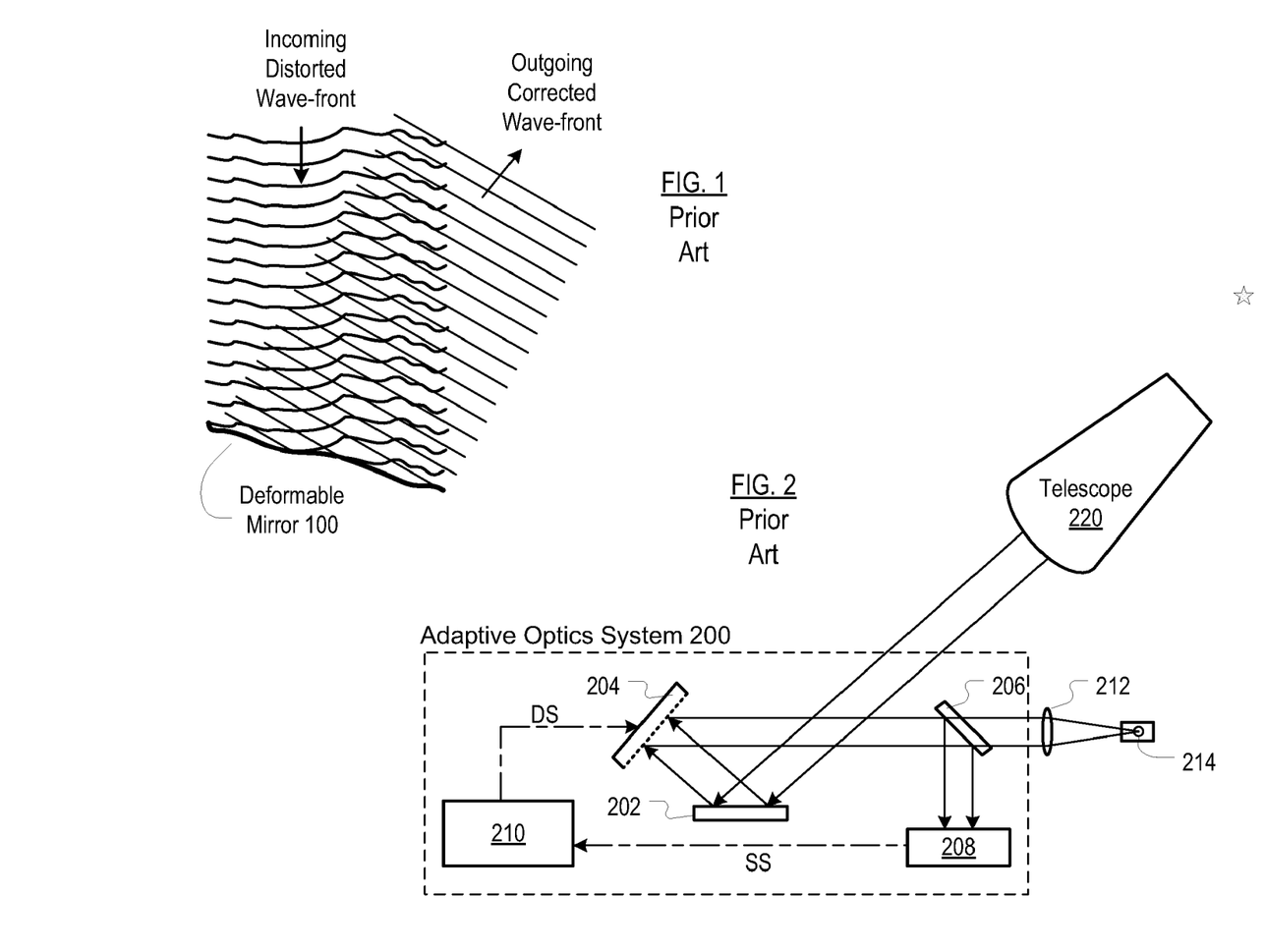
FIG. 1 depicts the correction of a distorted wavefront using a deformable mirror, in known fashion.
FIG. 2 depicts a conventional adaptive optics system used in conjunction with an optical telescope.

Adaptive optics works by measuring the distortions in a wavefront and compensating for them with a spatial phase modulator, which is typically a deformable mirror. FIG. 1 depicts the conventional use of deformable mirror 100 to generate a corrected wavefront from an incoming distorted wavefront.

FIG. 2 depicts conventional adaptive optics system 200 for correcting for atmospheric turbulence. System 200 is shown in use with telescope 220. The adaptive optics system includes tilt mirror 202, deformable mirror 204, beam splitter 206, wavefront sensor 208, and processor/controller 210.

In operation, electrical signal DS that drives deformable mirror 204 is based on measurements obtained from wavefront sensor 208. More particularly, wavefront sensor 208 measures, in real time, the optical aberrations that remain after the corrections. Two methods are primarily used to measure the degraded wavefront. In one method, a "Shak-Hartmann" device is used. This device measures the slope of the wavefront from the positions of the images of the reference star, as given by each sub-pupil. The other method is "curvature sensing." In this method, the intensities measured in strongly defocused images that are provided directly give the local curvatures of the wavefront.

For either method, wavefront sensing is typically performed on a reference or "guide" star. The observed object itself can be used for wavefront sensing if the object is bright enough and has sufficiently sharp light gradients. If not, an artificial guide star—a laser—is used. The measurement can be performed in the visible range for observation in the infrared, or in the infrared range itself if, for example, the reference star is too faint in the visible range.

Wavefront sensor 208 sends electrical signal SS, which contains wavefront measurement information, to processor/controller 210. The processor/controller processes the measurement information and determines, based on this information, how to alter the shape of deformable mirror 204 to achieve near-zero optical aberration. Processor/controller 210 then generates electrical drive signal DS, which is received by deformable mirror 204. The shape of mirror 204 is altered, based on the drive signal (discussed further below). A servo system or feedback loop is thus created (206→208→210→204→206) to obtain near-zero aberration by continuously adjusting the shape of deformable mirror 204. The light that passes through beam splitter 206 is optically processed (e.g., focused, etc.) by optics 212 to create the final image 214.

It will be appreciated that the correction process must be performed very quickly (within about 0.5 to 1 ms), otherwise the state of the atmosphere may have changed, rendering the wavefront correction inaccurate. (The required computing power can exceed several hundred million operations for each set of commands sent to a 250-actuator deformable mirror.)

Because of the high bandwidth and the small field to which correction can generally be applied, adaptive optics uses a small deformable mirror with a diameter of 8 to 20 cm located behind the focus of the telescope, at or near an image of the pupil. In some current projects, the possibility of using a large deformable secondary mirror is being developed. The choice of the number of (usually piezoelectric) actuators is a tradeoff between degree of correction, use of faint reference sources, and available budget. For instance, a near-perfect correction for an observation done in visible light with an 8-m telescope would require about 6400 actuators, whereas similar performance in the near infrared range requires only about 250 actuators.

A large number of actuators require a similarly large number of sub-apertures in the wavefront sensor. This means that for correction in the visible range, the reference star should be about (6400/250) or 25 times brighter than if correcting in the infrared range. Most current astronomical systems are designed to provide diffraction-limited images in the near-infrared range with the capability for partial correction in the visible range. Some military systems for satellite observations in the USA do, however, provide full correction in the visible range on at least 1-meter class telescopes.

The deformable mirror is controlled using zonal or modal control methods. In zonal control, each zone or segment of the mirror is controlled independently by wavefront signals that are measured for the sub-aperture corresponding to that zone. In modal control, the wave front is expressed as the linear combination of modes that best fit the atmospheric perturbations.

Figure 3A:
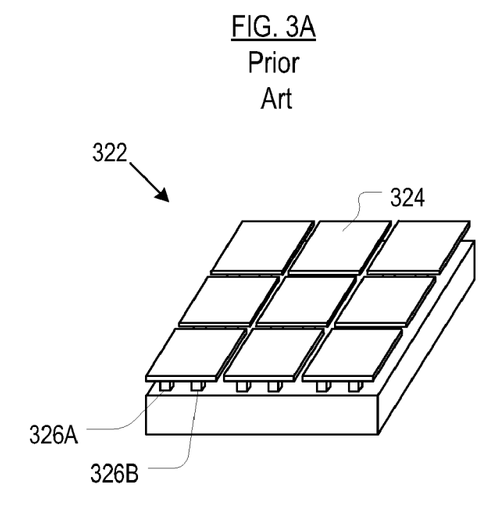
FIG. 3A depicts a perspective view of a conventional segmented mirror.
Figure 3B:
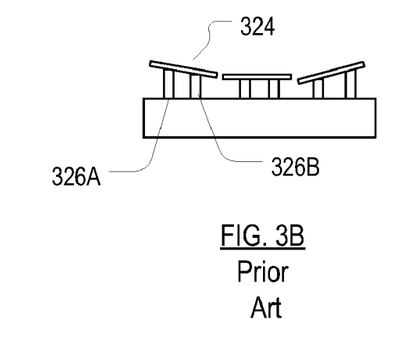
FIG. 3B depicts a side view of the segmented mirror of FIG. 3A, wherein individually-addressable, piston-type actuators are used to deform individual segments of the mirror.

There are several types of deformable mirrors that can be used in adaptive optics systems. One type is a segmented deformable mirror, an example of which is depicted in FIGS. 3A and 3B. Segmented deformable mirror 322 comprises an array of independently actuated flat mirror segments 324. Each segment 324 can move a small distance back and forward, based on the operation of piston-type actuators 326A and 326B, to approximate the average value of the wave front over the area of the segment. These type of mirrors typically exhibit little or zero cross-talk between actuators.

But such stepwise approximation of the wavefront works poorly for smooth continuous wave fronts. In particular, sharp edges of the segments and gaps between the segments contribute to the light scattering, thereby limiting the applications to those that are non-sensitive to scattered light. Considerable improvement of the approximation performance of the segmented mirror can be achieved by introducing three degrees of freedom per segment: piston, tip, and tilt. These mirrors require three times more actuators than piston-segmented mirrors and they suffer from diffraction on the segment edges.

Figure 4A:
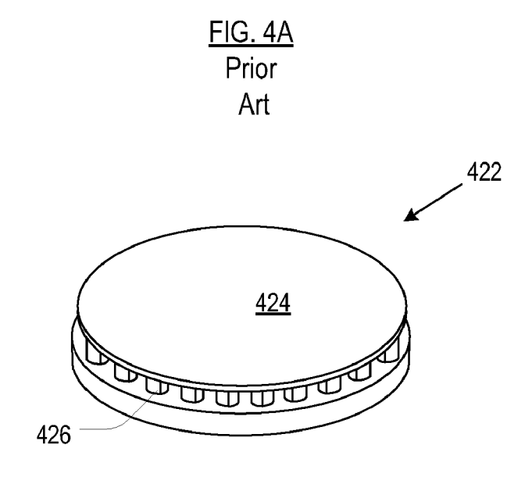
FIG. 4A depicts a perspective view of a conventional continuous faceplate deformable mirror.
Figure 4B:
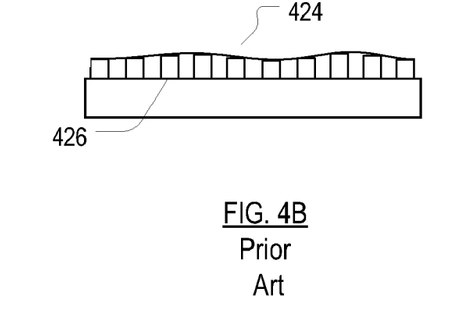
FIG. 4B depicts a side view of the conventional continuous faceplate deformable mirror of FIG. 4A, wherein individually-addressable, piston-type actuators are used to deform the continuous surface of the mirror.

Another type of deformable mirror is the continuous faceplate deformable mirror, as typified by mirror 422 of FIGS. 4A and 4B. This type of deformable mirror includes a plurality of discrete actuators 426 that abut the back surface of thin deformable reflective faceplate 424. The shape of faceplate 424 is controlled by the operation of the discrete actuators.

Some other embodiments (not shown) of the continuous faceplate deformable mirror have discrete actuators positioned on the backside of a deformable plate, the front side of which receives a reflective face plate. The discrete actuators alter the shape of the plate, which in turn, alters the shape of the face plate. In any case, the continuous faceplate deformable mirror is considered to be among the best of the deformable mirrors because they enable smooth wavefront control with a very large number of degrees of freedom.

Yet another deformable mirror is the membrane deformable mirror, which is formed by a thin conductive and reflective membrane that is stretched over a solid flat frame. The membrane can be deformed electrostatically by applying control voltages to electrostatic electrode actuators that are positioned under or over the membrane. If there are any electrodes positioned over the membrane, they are transparent. It is possible to operate the mirror with only one group of electrodes positioned under the mirror. In this case, a bias voltage is applied to all electrodes, to make the membrane initially spherical. The membrane can move back and forth with respect to the reference sphere.

A further type of deformable mirror is the bimorph deformable mirror. This type of deformable mirror is formed by two or more layers of different materials. One or more (active) layers are fabricated from a piezoelectric or electro-strictive material. An electrode structure is patterned on the active layer to facilitate local response. The mirror is deformed when a voltage is applied to one or more of its electrodes, causing them to extend laterally, which results in local mirror curvature. Bimorph mirrors are rarely made with more than 100 electrodes.

MEMS-based deformable mirrors have been fabricated using bulk or surface micromachining. An advantage of MEMS mirrors is that they can be inexpensive compared to other deformable mirrors.

To correct turbulence for extremely large telescopes (30 to 100 meters in diameter) in the visible range, deformable mirrors with 10,000 to 100,000 actuators will be required. One approach for producing these mirrors relies on MEMS processing, using micro or nano-lithographic techniques. The resulting small mirror elements would be deflected by electrostatic forces. The problem with this type of approach is the insufficient stroke of the actuation system, not to mention the exceedingly large number of actuators that are required.

As a consequence, there is a need for a different approach to actuating a deformable mirror for use in an adaptive optics system.

SUMMARY

The present invention provides a system and method for moving a surface, such as a deformable mirror, without some of the drawbacks and costs of the prior art. In accordance with the illustrative embodiment of the present invention, "dispersion forces" are used to actuate a deformable mirror in an adaptive optics system.

Dispersion forces. van der Waals forces include attractions between atoms, molecules, and surfaces. They differ from covalent and ionic bonding in that they are caused by correlations in the fluctuating polarizations of nearby particles, as a consequence of quantum dynamics. Intermolecular forces have four major contributions. In general, an intermolecular potential has a repulsive component and an attractive component, which, in turn, consists of three distinct contributions. The three contributions to the attractive component include:

The electrostatic interactions between charges (in the case of molecular ions), dipoles (in the case of molecules without inversion center), quadrupoles (all molecules with symmetry lower than cubic), and in general between permanent multipoles. The electrostatic interaction is sometimes called Keesom interaction or Keesom force after Willem Hendrik Keesom.

The second source of attraction is induction (also known as polarization), which is the interaction between a permanent multipole on one molecule with an induced multipole on another. This interaction is sometimes measured in debyes after Peter J. W. Debye.

The third attraction is usually named after Fritz London who himself called it "dispersion." This is the only attraction experienced by non-polar atoms, but it is operative between any pair of molecules, irrespective of their symmetry.

It is this third attraction, van der Waals-London forces, which are particularly relevant to the present disclosure. London was the first to show that a full explanation of the van der Waals force between two neutral atoms must be fundamentally non-classical and can only be provided by means of non-relativistic quantum mechanics. His treatment was based on the evaluation of the mutual interaction energy of the fluctuating dipoles of two neutral atoms at a given distance.

It was eventually discovered that the non-relativistic van der Waals-London potential does not accurately account for the observed interaction properties of particles in certain colloids. Casimir and Polder were the first to show that this discrepancy was due to the fact that the propagation time of the electromagnetic interaction between the two dipoles is important and cannot be neglected when compared to the natural frequencies of atomic oscillation at relatively large mutual distances. In other words, a complete explanation of inter-atomic forces requires the fully relativistic framework of quantum electro-dynamics. Casimir analyzed the macroscopic interaction between two neutral parallel perfectly conducting planes separated by a gap and obtained the equation for the force between them, now referred to as the "Casimir force."

Because of these findings, the term "van der Waals force" is often used to refer to the unretarded interaction, in which propagation time is negligible, whereas the term "Casimir force" refers to the fully retarded interaction (propagation time is not negligible) between perfect conductors. Since the detailed equation for the force between two dielectrics, which corresponds to neither case above, was first given by Lifshitz, the term "Lifshitz-Casimir force" occasionally appears.

The term "dispersion force(s)" will be used in the present disclosure and the appended claims to refer to interactions, such as the van der Waals force, the Casimir force, and the Lifshitz-Casimir force, which depend on the optical properties of the boundaries.

It is notable that there are several interpretations for the existence of dispersion forces. One interpretation is that the presence of two boundaries causes a change of the energy of the ground state of the electromagnetic field in the gap, which is ever present due to the uncertainty principle. Another interpretation is that the force between the two plates can be viewed as a macroscopic manifestation of the van der Waals forces between the constituent atoms, whereas empty space in the gap between them is given a truly "empty" (zero energy) attribute. A third interpretation is that the force is due a radiation pressure differential of the virtual photons colliding with the two planes inside and outside of the gap. Since the modes of oscillation of the electromagnetic field within the gap differ (are more limited) from those outside the gap, a net inward pressure results.

These differing interpretations are all logically acceptable, although mutually incompatible. Regardless, the results are mathematically equivalent and indistinguishable from one another. Regardless of its true nature, the present inventor recognized that dispersion forces can be manipulated to act on the reflecting surface of an adaptive optics component.

In accordance with the illustrative embodiment, this manipulation is effected through the use of material that has a variable (i.e., alterable) charge-carrier density, such as a semiconductor. More generally, a material that has a variable electrical conductivity is used. As explained further below, that material is used to provide an actuation surface that faces an adaptive optics element.

Figure 5A:
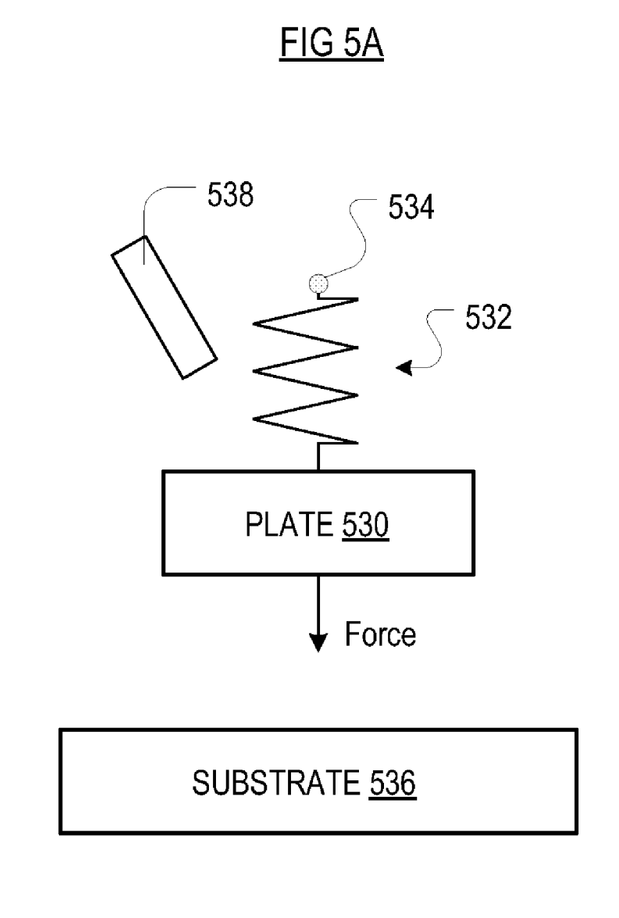
FIG. 5A depicts an embodiment of a dispersion-force-based actuator in accordance with an embodiment of the present invention. The actuator is depicted in a first state in which a radiation source is not operating.
Figure 5B:
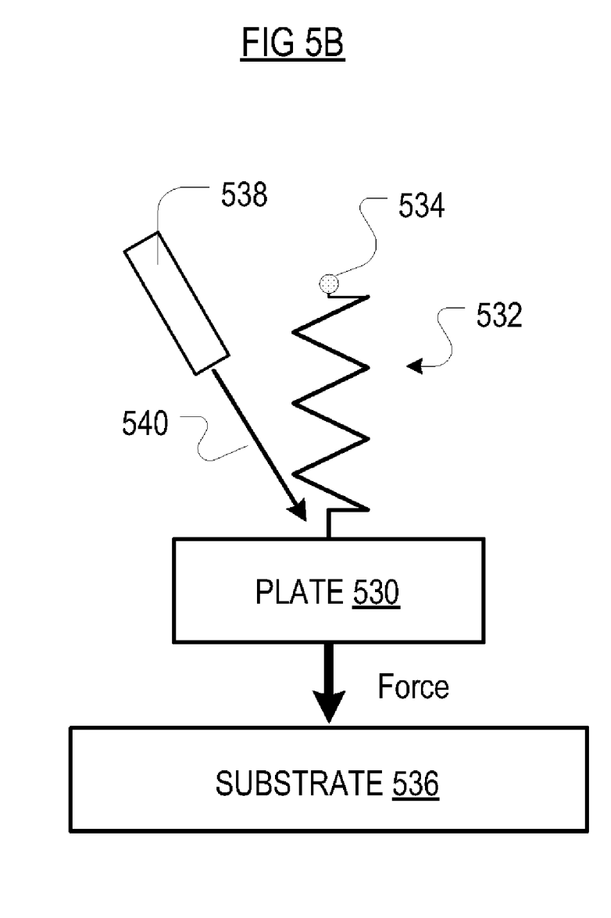
FIG. 5B depicts the dispersion-force-based actuator of FIG. 5A. The actuator is depicted in a second state wherein the radiation source is delivering radiation to the actuator.

The underlying concept of dispersion-force actuation is depicted in FIGS. 5A and 5B. As depicted in FIG. 5A, actuator plate 530, which is formed from a semiconductor or electrically conductive material, is coupled to spring 532 having fixed end 534. Actuator plate 530 is in equilibrium against the dispersion forces that attracts it to underlying substrate 536 (e.g., a mirror, etc.). Radiation source 538 (e.g., laser, etc.) is directed at the actuator plate but is not turned on.

In FIG. 5B, radiation source 538 is turned on, exposing actuator plate 530 to radiation 540. The radiation increases the density of charge carriers in actuator plate 530. The increase in the charge carriers, in turn, causes an increase in the dispersion forces between the two boundaries—actuator plate 530 and substrate 536—such that spring 532 stretches and the actuator plate moves closer to the substrate.

In these Figures, spring 532 is provided by way of illustration, not limitation, as an embodiment of a linkage, mechanism, coupling, or the like that enables actuator plate 530 to move in response to a change in the dispersion forces between the plate and substrate. In conjunction with the present disclosure, those skilled in the art will be able to replace the spring of FIGS. 5A and 5B with any one of a variety of linkages, mechanisms, couplings, etc., as suits the particulars of any given application.

FIGS. 5A and 5B depict how, using dispersion-force-based actuation, movement is induced by light alone; there is no need for electrostatic actuation, piezoelectric actuation, thermal actuation, or the like. (Although a change in charge carrier density, as is required for actuation, can be caused in a variety of ways including, without limitation, a change in temperature, by delivering an electrical signal to appropriate p-n junctions, by X-ray radiation, and by mechanical stresses, to name a few.)

Dispersion-force actuation can be applied, with simple modifications, to adaptive optics, energy panels, sensors, RF-MEMS or RF-NEMS type oscillators, high-powered laser weapons, among other applications. In the illustrative embodiment, improved adaptive optics systems are provided by using dispersion-force-based actuators to actuate a deformable mirror.

In some embodiments, the light that is used to actuate the dispersion-force-based actuators is generated by a laser that is under the control of a processor, wherein the processor controls the laser based on information that the processor receives from a wavefront sensor.

In some other embodiments, the light that actuates the dispersion-force based actuators is a portion of the corrected optical beam. For some of these embodiments, this portion of the corrected optical beam is modified in some manner (e.g., intensity attenuation, frequency shift, phase modulation) based on information obtained by the wavefront sensor. In some other embodiments, the portion of the incident light is not modified by information from the wavefront sensor. Rather, it is delivered to the semiconducting elements unaffected (i.e., not processed).

In any case, the light impinges upon actuator plate of each actuator, thereby changing the dispersion force between each individual actuator plate and each corresponding (discrete) mirror element or portion of a continuous deformable mirror. The change in the dispersion force will move the mirror element or mirror portion an appropriate amount to account for the degraded incoming wavefront at that location. Thus, the mirror is actuated by physical processes that are exclusively within the actuator plate, in conjunction with the incoming light. In such embodiments, no separate electrical actuation is required.

As indicated above, there are some embodiments in which the adaptive optics system is arranged so that the portion of light that is conducted to the actuator plates is not processed. Rather, by virtue of the arrangement of the actuator plates and the deformable mirror, light that impinges on the actuator plates results in changes in the dispersion force between each actuator plate and each mirror segment or mirror portion. In such embodiments, the system "automatically" corrects for wavefront degradation by virtue of the arrangement of the system; no processing is required.

The advantages of dispersion-force-based actuation over conventional actuation strategies include:

The ability to dynamically address a particular area of the deformable mirror is ultimately only limited by the diameter of the optical "spot" delivered to the semi conducting element and by charge carrier diffusion within the semiconductor over relevant timescales.

The ability to integrate functions within a structure in ways that are not possible using traditional actuation approaches. For example, this enables the incorporation of a feedback loop driven by light alone.

The proposed actuation method is not incompatible with existing approaches. As a consequence, traditional actuators might be used for certain tasks, in conjunction with the present approach. For example, traditional actuators can be used for large corrections, etc, and dispersion-force-based actuation is used for continuous fine tuning.

Since the dispersion forces that drive the present method exist between all materials, the present method and system does not require electrically-conductive surfaces.

Since the dispersion forces exist on all scales and even between existing atoms, actuation is possible even at the nanoscale level. Consequently, in some embodiments of the invention, extremely large numbers of segmented micro-mirrors are individually steered.

Because of the large dispersion force "pressures" that exist in the sub-micron range, the steering authority of actuators becomes larger as the scale of the structure decreases.

Because the dispersion force "pressure" is a strong function of the gap between the relevant surfaces, the steering resolution of the present method and system can be far larger than other methods.

The speed at which the dispersion-force actuated adaptive optics systems disclosed herein operate is given by the characteristic time of response of a semiconductor, which is much faster than any conventional method.

DETAILED DESCRIPTION

Definitions. The following terms are defined for use in this disclosure and the appended claims.

The term "dispersion force(s)" refers to interactions, such as the van der Waals force-London, the Casimir force, and the Lifshitz-Casimir force, which depend on the optical properties of the boundaries.

The terms "dispersion-force actuated," "dispersion-force-based actuation," or inflected forms thereof mean that actuation (i.e., of a device, etc.) is driven or effected by dispersion forces. This definition explicitly excludes electrostatic, piezo-electric, thermal, and other conventional forms of actuation.

The terms "optical signal," "light beam," "light," or "beam" refer to electromagnetic radiation that might or might not contain information. If the presence or absence of information in the signal or beam is unspecified, it is to be understood that neither are excluded from the interpretation.

Figure 6:
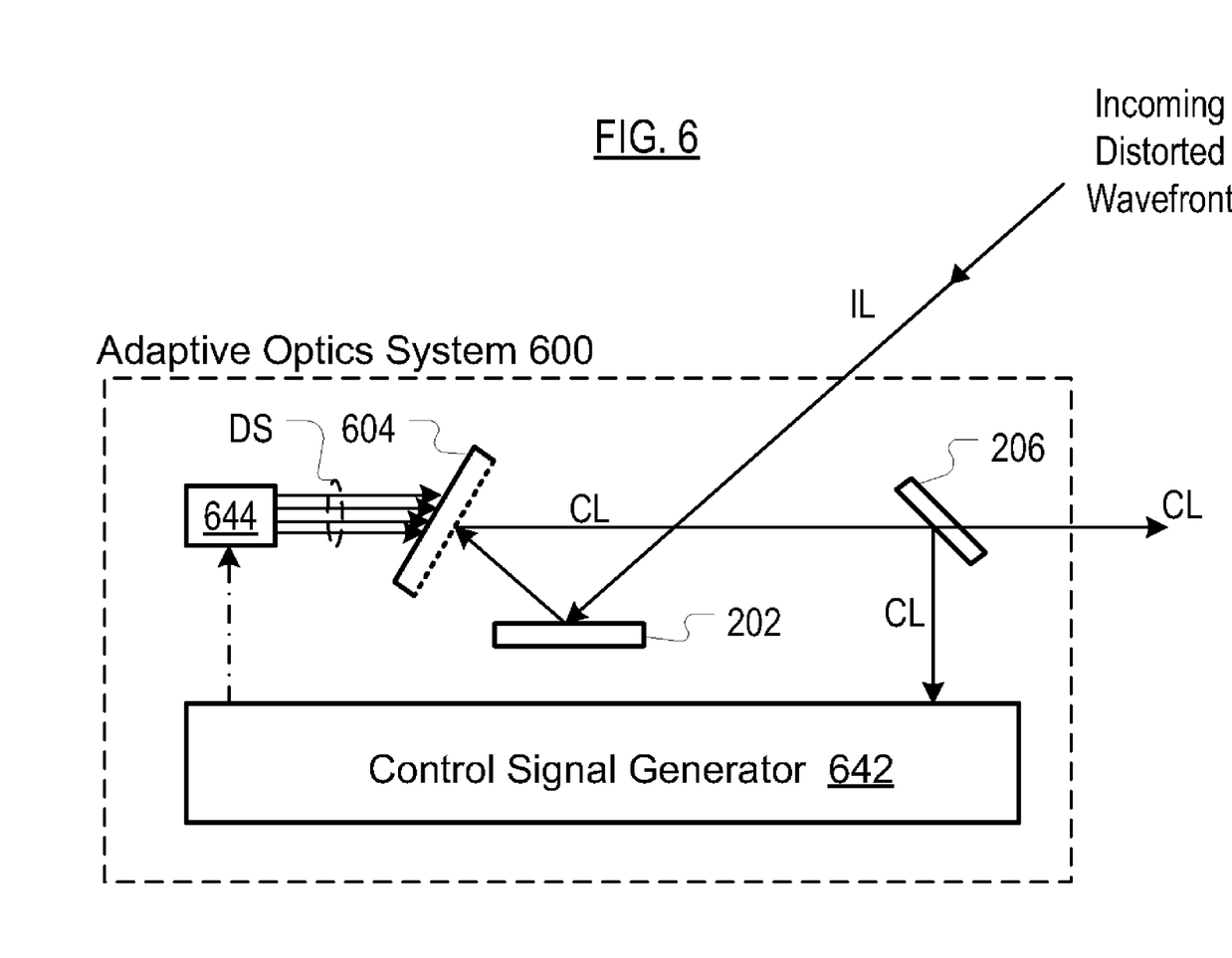
FIG. 6 depicts an adaptive optics system in accordance with the illustrative embodiment of the present invention.

FIG. 6 depicts adaptive optics system 600 in accordance with the illustrative embodiment of the present invention. The system includes "tilt" mirror 202, deformable mirror 604, beam splitter 206, and control signal generator 642 and drive signal generator 644.

Tilt mirror 202 is present in system 600 as a consequence of geometrical considerations. The tilt mirror receives incoming light IL, which has a distorted wavefront due to atmospheric turbulence, etc. The incoming light can be light that is to be imaged (e.g., light from a celestial object, etc.), light from a guide star (natural or artificial), or light from other sources and for other purposes. The light received by tilt mirror 202 is reflected to deformable mirror 604.

The deformable mirror corrects the distorted wavefront of incoming light IL. The wavefront is corrected by altering the surface of deformable mirror 604. The deformable mirror is dispersion-force actuated, in accordance with the present teachings. Deformable mirror 604 and various implementations of dispersion-force-based actuators are described in further detail below in conjunction with FIGS. 10, 11A/B, 12A/B, 13A/B and 14.

Beam splitter 206, which is a conventional optical element, receives "corrected" light beam CL (from deformable mirror 604) and splits it into two portions. One of the portions transits the beam splitter and is available for use (e.g., delivered to an imaging system to produce an image of a celestial object being viewed, etc.). The other portion of light beam CL is delivered to control signal generator 642.

Control signal generator 642 receives the light beam that is reflected by beam splitter 206. In the illustrative embodiment, the output of the control signal generator is electrical control signal CS. This signal controls the operation of drive signal generator 644. In particular, control signal CS causes drive signal generator 644 to generate a plurality of light beams that collectively define drive signal DS for driving the dispersion-force-based actuation system of deformable mirror 604. At least in some embodiments, the beams defining driving signal DS have at least one altered characteristic relative to the light beam CL. The altered characteristic can be, for example, intensity, wavelength distribution, and/or phase.

The surface profile of the deformable mirror is altered as dictated by the response of the actuation system to optical drive signal DS. The altered surface of deformable mirror 604 corrects for the distortions in the wavefront of the incoming light IL.

Figure 7:
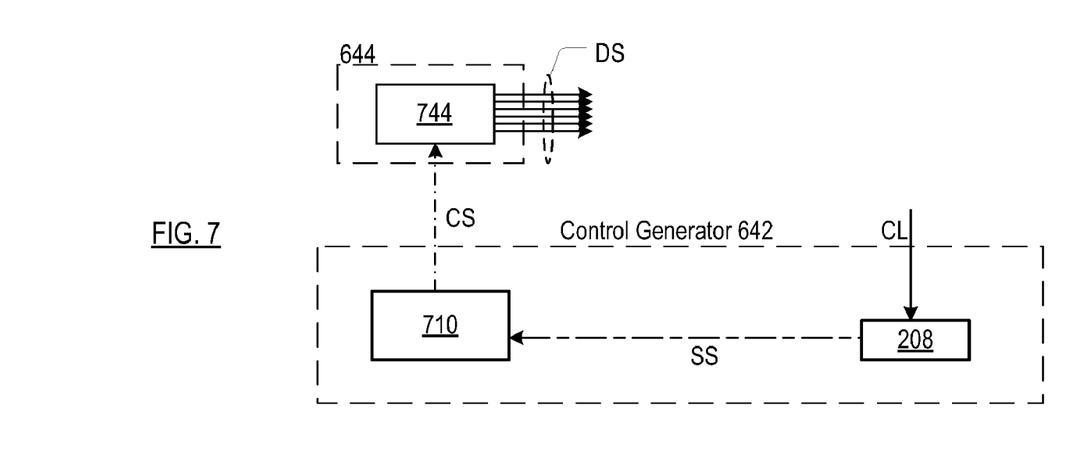
FIG. 7 depicts a first embodiment of a control signal generator and a drive signal generator for use in conjunction with an adaptive optics system in accordance with the present teachings.
Figure 8:
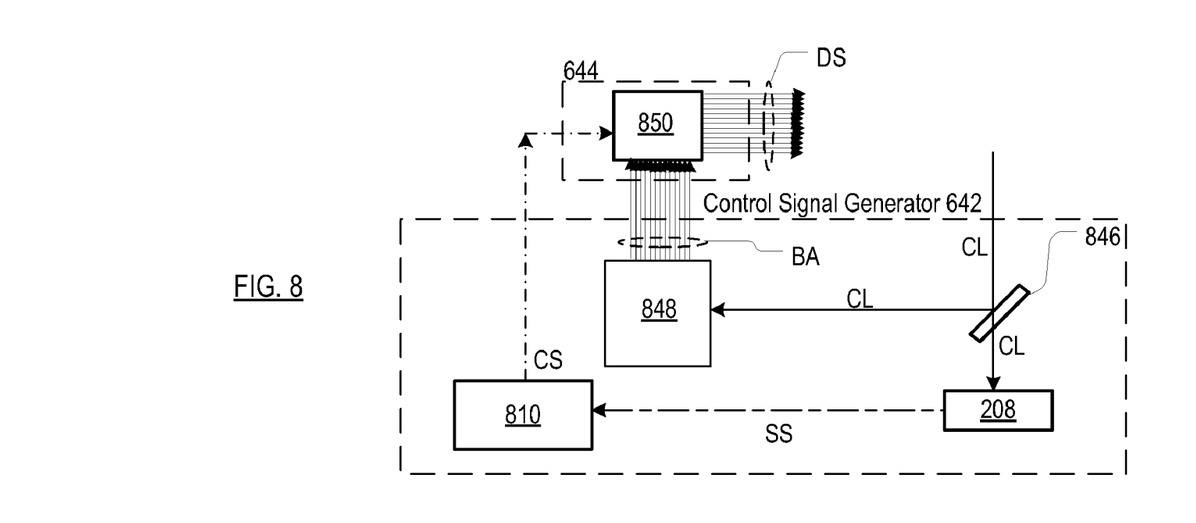
FIG. 8 depicts a second embodiment of a control signal generator and a drive signal generator for use in conjunction with an adaptive optics system in accordance with the present teachings.
Figure 9:
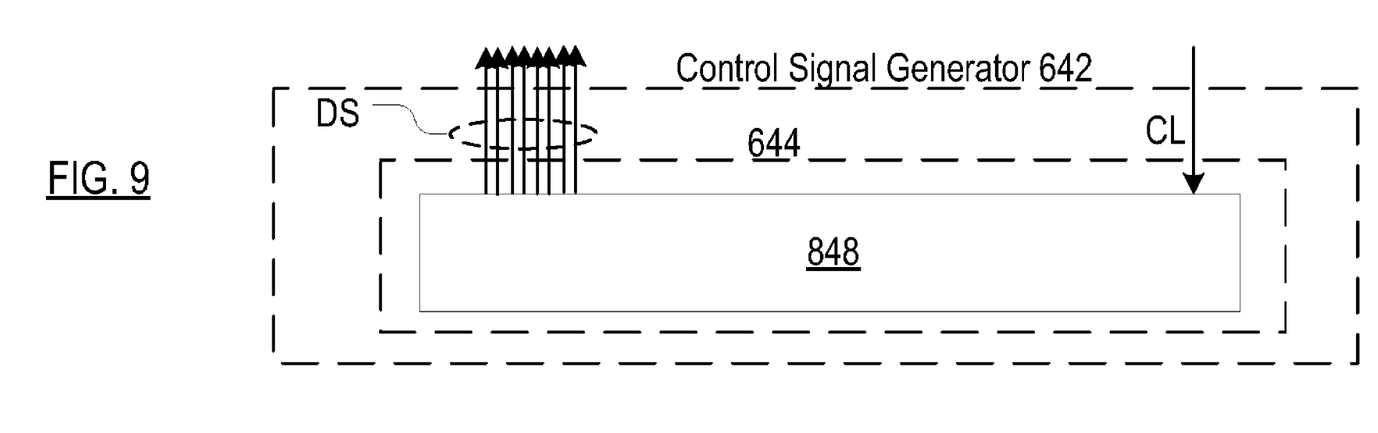
FIG. 9 depicts a third embodiment of a control signal generator and a drive signal generator for use in conjunction with an adaptive optics system in accordance with the present teachings.

Control Signal Generator 642 and Drive Signal Generator 644. FIGS. 7 through 9 depict several embodiments of the control signal generator and the drive signal generator. In the embodiment that is depicted in FIG. 7, control signal generator 642 comprises wavefront sensor 208 and computer/controller 710. The drive signal controller comprises controlled radiation source 744.

Wavefront sensor 208 is a conventional device that measures, in real time, the optical aberrations that remain in "corrected" light beam CL, as discussed in the Background section of this specification. Wavefront sensor 208 generates and sends electrical signal SS, which contains wavefront measurement information, to processor/controller 710.

For this embodiment, processor/controller 710 is general-purpose computer and appropriate drivers/control circuitry for controlling drive signal generator 644, which in this embodiment is radiation source 744. Processor/controller 710 processes the measurement information that is contained in signal SS and determines, based on this information, how to alter the shape of deformable mirror 604 to achieve near-zero optical aberration. Algorithms for determining the manner in which to change to the surface profile of a deformable mirror as a function of the waveform distortion are familiar to those skilled in the art, who will understand their use and application.

Processor/controller 710 is further capable of generating electrical control signal CS that controls radiation source 744. In the embodiment of FIG. 7, the radiation source is a plurality of lasers. Under the control of processor/controller 710, the lasers emit light (a plurality of beams of light) that collectively defines optical drive signal DS, which is used to actuate the dispersion-force-based actuators of deformable mirror 604. The lasers are typically low power, such as in the milliwatt range.

As described more fully later in this specification, the dispersion-force-based actuation system of deformable mirror 604 includes a plurality of actuators (and, in some embodiments, the drive signal generator is also considered part of the dispersion-force-based-actuation system. In the illustrative embodiment, each actuator is driven by one (or more) beams of light of drive signal DS.

In some embodiments, delivering multiple beams of light to multiple dispersion-force-based actuators is accomplished using an array of VCSELs (vertical cavity surface emitting lasers), wherein there is at least one VCSEL in the array per actuator of the deformable mirror 604. (See, e.g., FIG. 10.) In such an embodiment, radiation source 744 (i.e., the VCSEL array) is co-located with the dispersion-force-based actuation system of deformable mirror 604 (as opposed to being separate therefrom, as depicted in FIG. 7).

In some other embodiments, a single laser source is used in conjunction with a diffractive optical element, such as a Dammann grating. The Dammann grating is capable of splitting an incoming beam of light into a one- or two-dimensional array of light beams. The grating can generate an array of uniform intensity and equally-spaced spots for an incoming monochromatic light beam. Since the spots will be of uniform intensity, they must be "chopped" to provide a variable (average) intensity. This can be done via various pulse width modulation schemes, as are known to those skilled in the art.

In conjunction with the present disclosure, those skilled in the art will be able to develop algorithms to generate control signal CS for controlling radiation source 744 and associated circuitry (e.g., for PWM, etc.) to generate drive signal DS.

In the embodiment that is depicted in FIG. 8, control signal generator 642 comprises beam splitter 846, Dammann grating system 848, wavefront sensor 208, and computer/controller 810, interrelated as shown. Drive system generator 644 comprises processor 850.

Beam splitter 846 is a conventional optical element, which is used in this embodiment to split the portion of the corrected beam CL that is received by drive signal generator 642 into two more beams. The beam that transits beam splitter 846 is received by wavefront sensor 208.

As in the embodiment depicted in FIG. 7, wavefront sensor 208 measures, in real time, the optical aberrations that remain in "corrected" light beam CL. Wavefront sensor 208 generates and sends electrical signal SS, which contains wavefront measurement information, to processor/controller 810.

Processor/controller 810 is general-purpose computer and includes appropriate drivers/control circuitry for controlling the operation of drive signal generator 644, which in this embodiment is optical processor 850. As in the embodiment depicted in FIG. 7, processor/controller 810 processes the measurement information that is contained in signal SS and determines, based on this information, how to alter the shape of deformable mirror 604 to achieve near-zero optical aberration.

Processor/controller 810 is further capable of generating control signal CS that controls optical processor 850. The optical processor is a (conventional) device that is capable of altering a characteristic of an optical beam. In particular, optical processor 850 is one or more devices that are capable of altering the intensity, frequency/wavelength, and/or phase of one or more light beams. Such devices are familiar to those skilled in the art, who will understand their use and application in conjunction with the embodiments described herein.

The portion of the beam that doesn't transit beam splitter 846 is reflected by it toward Dammann grating system 848. The Dammann grating receives the portion of the beam CL and splits it into a 2d array of beams BA of uniform intensity. Additional optics are used, as appropriate, to deliver beams BA to optical processor 850 of drive signal generator 644.

Under the control of processor/controller 810 (i.e., signal CS), optical processor 850 will individually alter one or more characteristics of each of beams BA. In conjunction with the present disclosure, those skilled in the art will be able to develop algorithms to generate control signal CS for controlling optical processor 850. After alteration, those beams collectively define drive signal DS. The individual beams of signal DS are delivered (e.g., via waveguides, etc.) to the dispersion-force-based actuators that control deformable mirror 604.

In the embodiment that is depicted in FIG. 9, control signal generator 642 and drive signal generator 644 are simply Dammann grating system 848. In this embodiment, no optical processing is performed on corrected light beam CL (other than simply splitting the beam). The portion of corrected light beam CL that is received by Dammann grating system 848 is split into a 2-d array of beams that are then directed, via waveguides, etc., to the dispersion-force-based actuators of deformable mirror 604.

This embodiment, wherein no "correction" is applied, can be employed as follows. Consider a scenario in which a telescope is imaging a single star that is positioned in the center of the image. Any departure from a Gaussian profile will therefore require a correction. Waveguides that deliver light to the dispersion-force-based actuation system of deformable mirror 604 are arranged so that any departure from a Gaussian profile is corrected. In some embodiments, this is implemented by disposing the waveguides at specific distances from the actuator plates as a function of the radial distance from the center of the array. If the power of the light is sufficient, the distorted image of the star will drive each actuator plate to produce a corrected image without any processing. Actually, the processing is implicit in the arrangement of the deformable mirror and dispersion-force-based actuation system.

Figure 10:
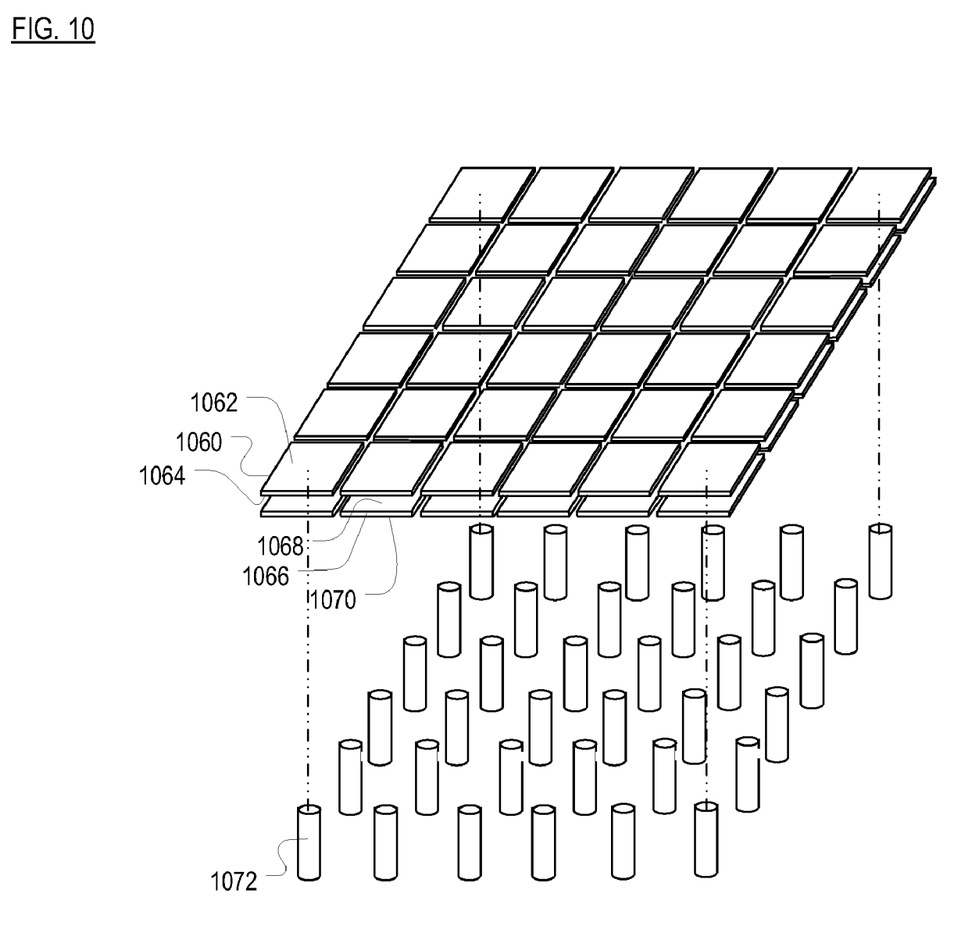
FIG. 10 depicts an exploded view of a segmented mirror that is actuated by dispersion-force actuation in accordance with the present teachings.

Dispersion-Force Actuated Deformable Mirrors. FIG. 10 depicts, via an "exploded" view, an embodiment of a deformable mirror, such as deformable mirror 604. The deformable mirror includes a dispersion-force-based actuation system, in accordance with illustrative embodiment of the present invention. The deformable mirror of FIG. 10 is a segmented mirror. FIG. 10 depicts only a portion of the segmented mirror; typically, such a mirror would include many more than the thirty-six segments shown.

The deformable mirror comprises a plurality of reflective mirror segments 1060 and a dispersion-force-based actuation system. Each mirror segment has "upper" reflecting surface 1062 and a lower surface 1064. The mirror segments can be formed from any suitable structural material (e.g., suitable for MEMS processing, etc.), such as single crystal silicon, other semiconductors, polysilicon (less desirable due to stress issues). Reflecting surface 1062 can be coated with a metal, such as gold, as a function of operating wavelength, to enhance reflectivity. In some other embodiments, the segment can comprise a dielectric mirror. Those skilled in the art will know how to select materials of construction for mirror segments 1060 and how to fabricate the mirror segments.

The mirror segments are supported by flexible arms, etc., that permit the segments to move "up" and "down." Arrangements for supporting such mirror segments are well known to those skilled in the art.

The mirror segments are actuated by a dispersion-force-based actuation system, which comprises actuator plate 1066 and array of VCSELs 1072. Actuator plate 1066 is spaced apart from and faces lower surface 1064 of mirror segment 1060. The actuator plate comprises a material that has a variable (i.e., alterable) charge-carrier density, such as a semi-conductor. More generally, the actuator plate comprises a material that has a variable electrical conductivity. In some embodiments, a second actuator plate is disposed on lower surface 1064 of mirror segment 1060.

In FIG. 10, mirror segment 1060 and actuator plate 1066 are depicted as being the same size. In some embodiments, the actuator plate is smaller than mirror segment 1060 (see, e.g., FIGS. 11A/B, 12A/B). The spacing between the facing surfaces 1068 of an actuator plate 1066 and surface 1064 of mirror segment 1060 (or second actuator plate) is typically about 1 micron, although smaller or larger gaps can suitably be used. Smaller gaps can create greater dispersion forces but will limit the range of movement of the surface of the deformable mirror.

An array of VCSELs 1072 is disposed proximate to surface 1070 of actuator plate 1066. In this embodiment, the array is dimensioned and arranged so that a single VCSEL aligns with each actuator plate 1066. The array of VCSELs is depicted as being relatively further from the actuator plates than would typically be the case, but it enhances the clarity of the Figure. Such spacing must account for any divergence of the light beams, to avoid cross talk between adjacent light beams and to assure that a desired portion of an actuator plate is irradiated.

When a VCSEL 1072 emits light onto surface 1070 of an actuator plate 1066, the dispersion force between that plate and facing mirror segment 1060 (or second actuator plate) will increase relative to the dispersion force that exists in the absence of the emitted light (due to the increase in charge-carrier density). The mirror segments are free to move towards and away from the actuator plates and will be in equilibrium with the dispersion forces therebetween. Therefore, the gap between each paired actuator plate 1066 and mirror segment 1060 will vary as a function of the dispersion force. Of course, this affects the profile of the (reflecting) surface of the deformable mirror.

Currently, VCSELs having a diameter as small as about 10 to 15 microns are available. An array of such VCSELs could be used in conjunction with mirror segments that are about 25 microns square to provide tremendous "granularity" to a deformable mirror. It will be appreciated that increases in the granularity of the deformable mirror will require increases in processing power.

FIGS. 11A and 11B, 12A and 12B, 13A and 13B, and 14 depict various embodiments of a dispersion-force-based actuation system suitable for use in conjunction with deformable mirrors.

Figure 11A:
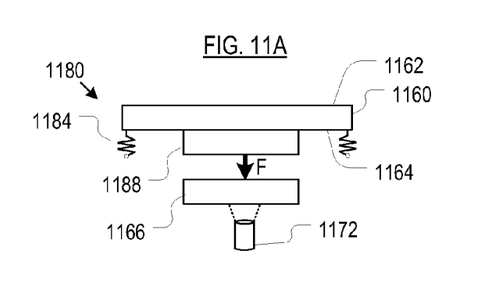
FIGS. 11A and 11B depict a first embodiment of a dispersion-force actuated segmented mirror.
Figure 11B:
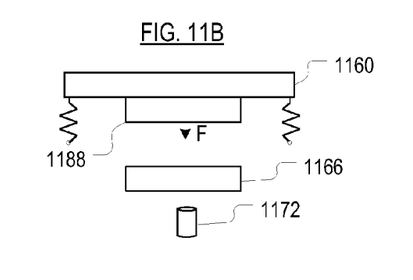

FIGS. 11A and 11B depict portion 1180 of segmented mirror, including a first embodiment of a dispersion-force-based actuator in accordance with the present teachings. The arrangement that is shown in FIGS. 11A and 11B is essentially the same arrangement as depicted in FIG. 10.

Portion 1180 comprises mirror segment 1160, which can be a semiconductor, etc., as described above in conjunction with the deformable mirror of FIG. 10. Segment 1160 is movably suspended by resilient supports 1184. Segment 1160 has "upper" reflective surface 1162 and lower surface 1164. Disposed on lower surface 1164 is secondary actuator plate 1188. Spaced apart from the secondary actuator plate is primary actuator plate 1166. Light source 1172 is in the proximity of the primary actuator plate 1166. Light source 1172 can be a VCSEL, the end of a waveguide, etc. The light source delivers (a beam of) drive signal DS to the primary actuator plate.

In FIG. 11A, light source 1172 is depicted delivering light to primary actuator plate 1166. When irradiated in this manner, the density of charge carriers in the primary actuator plate increases, thereby increasing the dispersion force between the two actuator plates. The movably supported secondary actuator plate 1188/mirror segment 1160 moves toward primary actuator plate 1166 until it is in equilibrium with the dispersion force F.

In FIG. 11B, light source 1172 is off, such that light is not being delivered to primary actuator plate 1166. This causes a decrease in charge carrier density and a concomitant decrease in the dispersion force between spaced actuator plates 1188 and 1166. The supported actuator plate 1188/mirror segment 1160 will therefore find a new equilibrium point, increasing the gap between the two plates.

The dispersion-force-based actuation system and associated mirror segment depicted in FIGS. 11A and 11B is therefore capable of moving in "up" and "down" motion to alter the surface profile of a segmented mirror.

Figure 12A:
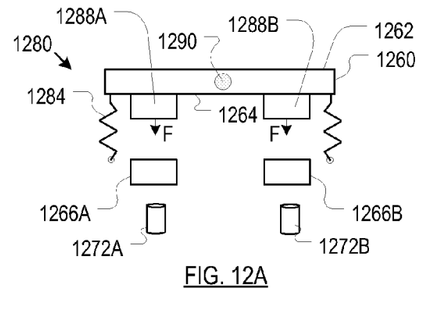
FIGS. 12A and 12B depict a second embodiment of a dispersion-force actuated segmented mirror.
Figure 12B:
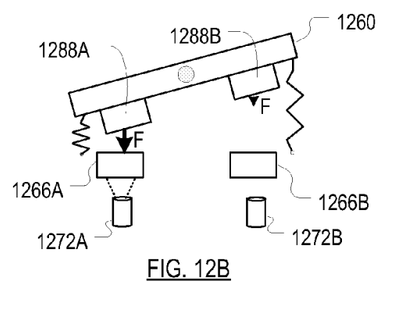

FIGS. 12A and 12B depict portion 1280 of segmented mirror, including a second embodiment of a dispersion-force-based actuator in accordance with the present teachings Portion 1280 comprises mirror segment 1260, which can be a semiconductor, etc., as described above in conjunction with the deformable mirror of FIG. 10. Segment 1260 is movably suspended by resilient supports 1284. Segment 1260 includes pivot pin 1290 which permits the segment to "tilt" or pivot about pin 1290. Segment 1260 has "upper" reflective surface 1262 and lower surface 1264.

Disposed on lower surface 1264 are two secondary actuator plates 1288A and 1288B. Spaced apart from the secondary actuator plate are primary actuator plates 1266A and 1266B. Light source 1272A is in the proximity of the primary actuator plate 1266A and light source 1272B is in the proximity of the primary actuator plate 1266B. Light sources 1272A/B can be VCSELs, the end of waveguides, etc.

Segment 1260 can be operated in "digital" fashion, as depicted in FIG. 12B, wherein the segments tilts one way or the other depending upon which of light sources 1272A or 1272B is "on." In FIG. 12B, source 1272 is operating so that the dispersion force between actuator plates 1288A and 1266A is greater than the dispersion force between actuator plates 1288B and 1266B. As a consequence, segment 1260 pivots to the "left."

Alternatively, segment 1260 can be operated in "analog" fashion. In such embodiments, light sources 1272A and 1272B operate simultaneously, wherein the light being emitted from the two sources is likely, at any given instant, to vary in at least one characteristic. As a consequence, the dispersion force between actuator plates 1288A and 1266A will be different than the dispersion force between actuator plates 1288B and 1266B. This will cause segment 1260 to tilt somewhat to one side or the other until the spacing between the paired actuator plates is in equilibrium with the dispersion forces therebetween. This provides a greater degree of "resolution" in that the amount of "tilt" of each mirror segment 1260 in the segmented mirror can be controlled.

The arrangement of FIGS. 12A and 12B can be modified to provide further resolution by adding a gimbal that permits segment 1260 to tilt about a second axis. In such an embodiment, four primary actuator plates (and four secondary actuator plates) would be used in conjunction with four light sources. This effectively segregates segment 1260 into four quadrants, wherein the dispersion force between the paired actuators in each quadrant can be independently controlled.

Figure 13A:
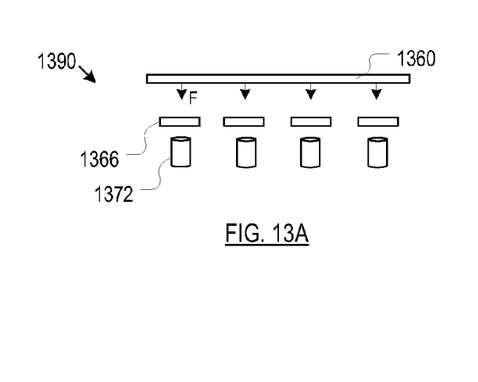
FIGS. 13A and 13B depict an embodiment of a dispersion-force actuated deformable continuous faceplate mirror.
Figure 13B:
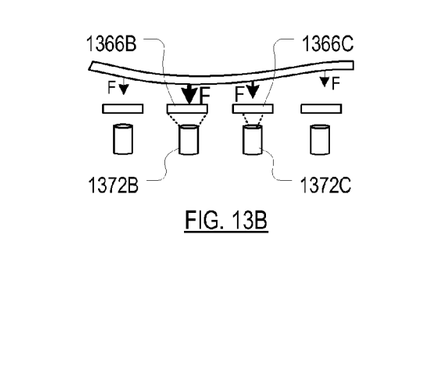

FIGS. 13A and 13B depict portion 1390 of a continuous faceplate deformable mirror, including a third embodiment of a dispersion-force-based actuator in accordance with the present teachings. The full mirror would have a surface similar to that of the prior art continuous faceplate mirror that is depicted in FIG. 4A.

Portion 1390 comprises faceplate portion 1360, can be a thin film dielectric material, single crystal silicon, rubber coated with a reflective material, mylar, etc. The faceplate is movably suspended in conventional fashion.

Disposed beneath and spaced apart from faceplate portion 1360 is a plurality of actuator plates 1366. Light sources 1372 are proximate to the actuator plates. Light sources 1372 can be a VCSEL, the end of a waveguide, etc.

In freely suspended regions (far from support boundaries), the distance between faceplate portion 1360 and underlying actuator plates 1366 is in equilibrium with the dispersion force therebetween. When light is delivered from a light source to the actuator plate, as depicted in FIG. 13B, the dispersion force will increase between the actuator plate and the overlying portion of the faceplate. This will cause that portion of the faceplate to be drawn towards that actuator plate. In FIG. 13B, the light delivered from source 1372B to actuator plate 1366B has greater intensity than the light delivered from source 1372C to actuator plate 1366C. This will result in a greater dispersion force between actuator plate 1366B and the overlying portion of faceplate than between actuator plate 1366C and the portion that overlies it. As a consequence, the faceplate portion 1360 will be drawn closer to 1366B than 1366C.

Since sources 1372A and 1372D are not operating, the dispersion force F is even less between the overlying corresponding actuator plates and region of the faceplate.

Figure 14A:
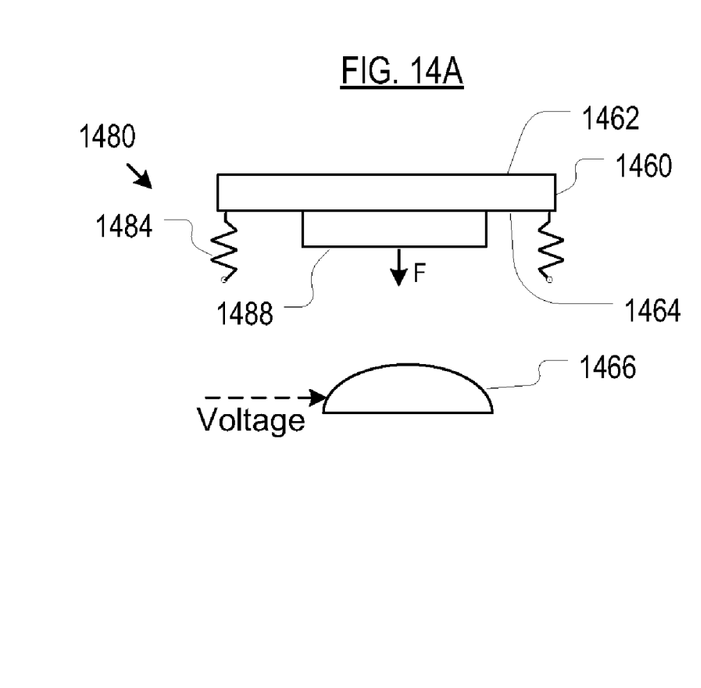
FIGS. 14A and 14B depict an embodiment of a dispersion-force-based actuator wherein the actuator has a deformable shape.
Figure 14B:
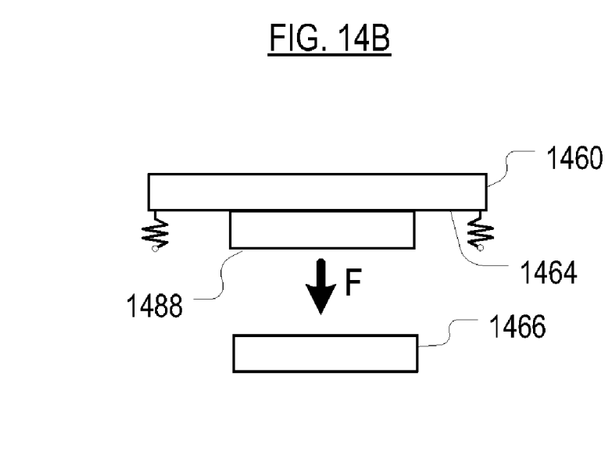

FIGS. 14A and 14B depict dispersion-force-based actuation, but in this embodiment, it is not charge-carrier density that is being altered to change the dispersion force. Rather, the shape of the actuation plate is altered to change the dispersion force.

It is known that the direction (attractive versus repulsive) and/or magnitude of the dispersion forces vary with a change in shape of two boundaries. For example, if the flat sides of two hemispheres are placed in proximity of one of another, the dispersion force will be repulsive. In some cases, the sign or affect on magnitude can be predicted based on what has already been observed. In other cases, it is not clear what the effect will be, although it is known that there will be an effect.

Portion 1480 comprises mirror segment 1460, which can be a semiconductor, etc., as described above in conjunction with the deformable mirror of FIG. 10. Segment 1460 is movably suspended by resilient supports 1484. Segment 1460 has "upper" reflective surface 1462 and lower surface 1464. Disposed on lower surface 1464 is secondary actuator plate 1488. Spaced apart from the secondary actuator plate is primary actuator plate 1466.

In this embodiment, primary actuator "plate" 1466 is capable of changing shape. In the embodiment shown in FIGS. 14A and 14B, the actuator plate changes from flat to hemispherical, such as upon the application of a voltage or temperature. Materials such as shape memory alloys can suitably be used. Alternatively, rather than having a material change shape, a mechanism can be used to rapidly move one of two actuator plates into position, wherein one plate is flat and the other is hemispherical.

In FIG. 14A, a voltage is applied to actuator plate 1466 to cause it to assume a hemispherical shape. In FIG. 14B, the voltage is withdrawn, such that the actuator plate adopts a rectangular shape. The dispersion force between the second actuator plate 1488 and primary actuator plate 1466 when the primary actuator plate is hemispherical is of lesser magnitude than when the primary actuator plate 1466 is rectangular in shape. As a consequence, stopping the voltage to actuator plate 1466 will cause mirror segment 1466 to move closer to actuator plate 1466.

Thus, FIGS. 11A/B, 12A/B, 13A/B, and 14A/B disclose several embodiments of a dispersion-force-based actuation system in accordance with the present teachings.

It is to be understood that many variations of the embodiments disclosed herein can easily be devised by those skilled in the art after reading this disclosure and that the scope of the present invention is to be determined by the following claims.

What is claimed is:

1. A method comprising:
reflecting a first light beam off of a reflective surface of a deformable mirror;
generating a control signal based on the reflected first light beam;
generating an optical drive signal based on the control signal; and
propagating the optical drive signal to a portion of a dispersion-force-based-actuation system that deforms the reflective surface responsive to the optical drive signal.

2. The method of claim 1 wherein the operation of generating a control signal further comprises obtaining measurements that are indicative of aberrations in a wavefront of the reflected first light beam.

3. The method of claim 1 wherein the operation of generating a control signal further comprises:
obtaining measurements that are indicative of aberrations in a wavefront of the reflected first light beam;
generating an information-bearing signal that contains information relating to the aberrations in the wavefront; and
generating the control signal based on the information-bearing signal.

4. The method of claim 1 wherein the operation of generating an optical drive signal further comprises:
receiving the control signal at an optical drive signal generator; and
generating a plurality of light beams, wherein:
(a) the plurality of light beams collectively compose the optical drive signal;
(b) a characteristic of at least some of the light beams differs from a characteristic of other of the light beams, based on the control signal;
(c) the difference in the characteristic results in a difference in a response of the dispersion-force-based actuation system.

5. The method of claim 4 wherein the operation of generating a plurality of optical beams further comprises:
distributing the energy of a portion of the reflected first light beam into a plurality of spatially-separated light beams; and
altering a characteristic of at least some of the spatially-separated light beams.

6. The method of claim 4 wherein the operation of generating a plurality of light beams further comprises generating a plurality of light beams via a plurality of lasers.

7. The method of claim 4 wherein the operation of generating a plurality of optical beams further comprises:
generating a light beam via a laser;
distributing the energy of the generated light beam into a plurality of spatially-separated light beams; and
altering a characteristic of at least some of the spatially-separated light beams.

8. The method of claim 1 further comprising:
receiving the first light beam at a primary mirror; and
directing the first light beam from the primary mirror to the reflective surface of the deformable mirror.

9. The method of claim 1 further comprising receiving the first light beam at a telescope.

10. A method comprising:
reflecting a first light beam off of a reflective surface of a deformable mirror;
distributing the energy of a portion of the reflected first light beam into a plurality of spatially-separated light beams; and
deforming the reflective surface of the deformable mirror by receiving the plurality of spatially-separated light beams at a plurality of dispersion-force-based actuators.

11. A method comprising:
generating a plurality of spatially-separated light beams, wherein the light beams vary as to a value of a characteristic; and
deforming a surface by propagating the light beams to a plurality of dispersion-force-based actuators, wherein the actuators move in response to differences in the value of the characteristic.

12. The method of claim 11 wherein the variation in the characteristic is based on a shape of a wavefront of a primary light beam, the method further comprising altering the wavefront of the primary beam by directing the primary light beam to the deformed surface.

13. The method of claim 11 wherein the characteristic is an intensity of the light beam.

14. The method of claim 11 wherein the characteristic is a wavelength of the light beam.

15. The method of claim 11 wherein the operation of generating a plurality of spatially-separated light beams further comprises generating the plurality of spatially-separated light beams via a plurality of vertical cavity surface emitting lasers.

16. The method of claim 11 wherein the operation of generating a plurality of spatially-separated light beams further comprises diffracting a light beam into the plurality of spatially-separated light beams.

* * * * *